United States Patent
Kraemer et al.

(10) Patent No.: US 7,997,066 B2
(45) Date of Patent: Aug. 16, 2011

(54) METHOD FOR MONITORING THE FUNCTIONALITY OF THE HEATING OF A CATALYTIC CONVERTER SITUATED IN AN EXHAUST SYSTEM OF AN INTERNAL COMBUSTION ENGINE

(75) Inventors: Gerd Kraemer, Baierbrunn (DE); Stefan Uhl, Marzling (DE); Wolf Kiefer, Groebenzell (DE); Gerhard Schulz, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 775 days.

(21) Appl. No.: 12/033,568

(22) Filed: Feb. 19, 2008

(65) Prior Publication Data

US 2008/0134668 A1   Jun. 12, 2008

Related U.S. Application Data

(63) Continuation of application No. PCT/EP2006/008010, filed on Aug. 12, 2006.

(30) Foreign Application Priority Data

Aug. 20, 2005 (DE) .......... 10 2005 039 393

(51) Int. Cl.
 *F02B 27/04* (2006.01)
 *F01N 3/00* (2006.01)
 *F01N 3/10* (2006.01)

(52) U.S. Cl. .......... 60/277; 60/273; 60/299; 60/300

(58) Field of Classification Search .......... 60/273, 60/274, 277, 284, 299, 300; 701/102, 103, 701/114, 115
See application file for complete search history.

(56) References Cited

U.S. PATENT DOCUMENTS

| | | | |
|---|---|---|---|
| 5,878,732 A * | 3/1999 | Engl et al. | 123/673 |
| 6,237,563 B1 * | 5/2001 | Froehlich et al. | 123/350 |
| 7,051,710 B2 | 5/2006 | Hochstrasser et al. | |
| 2002/0062814 A1 * | 5/2002 | Weiss | 123/320 |
| 2004/0055561 A1 * | 3/2004 | Wagner et al. | 123/299 |
| 2005/0065705 A1 * | 3/2005 | Hartmann et al. | 701/102 |
| 2008/0208430 A1 * | 8/2008 | Klein et al. | 701/102 |

FOREIGN PATENT DOCUMENTS

DE  101 49 477 A1  4/2003

OTHER PUBLICATIONS

Subject Matter Eligibility Test (M-or-T) for Process Claims, eligible Oct. 30, 2008.*

* cited by examiner

*Primary Examiner* — Thomas E Denion
*Assistant Examiner* — Audrey Klasterka
(74) *Attorney, Agent, or Firm* — Crowell & Morning LLP

(57) ABSTRACT

The diagnosis of the heating of a catalytic converter situated in an exhaust system of an internal combustion engine is described. The system includes monitoring the actual ignition angle intervention. A current ignition angle is acquired over a specified time and converted into a torque model used for catalytic converter heating. Using the torque model, a degree of fulfillment of executed catalytic converter heating measures is obtained and an error signal is generated by comparing the obtained degree of fulfillment to a limiting value.

14 Claims, 2 Drawing Sheets

METHOD FOR MONITORING THE FUNCTIONALITY OF THE HEATING OF A CATALYTIC CONVERTER SITUATED IN AN EXHAUST SYSTEM OF AN INTERNAL COMBUSTION ENGINE

CROSS REFERENCE TO RELATED APPLICATIONS

This application is a continuation of PCT International Application No. PCT/EP2006/008010, filed Aug. 12, 2006, which claims priority under 35 U.S.C. §119 to German Patent Application No. 10 2005 039 393.4 filed Aug. 20, 2005, the entire disclosures of which are herein expressly incorporated by reference.

BACKGROUND AND SUMMARY OF THE INVENTION

The present invention relates to a method for monitoring the functionality of the heating of a catalytic converter situated in an exhaust system of an internal combustion engine.

There are functions for catalytic converter heating in the engine controller for exhaust gas post-treatment, in particular for rapidly starting the catalytic converter or for rapidly reaching the light-off temperature. One of these functions is retarding the ignition angle and thus changing the combustion temperature in the exhaust system. The reduction of the untreated emission also accompanies this—A further secondary condition is that the efficiency decreases by the shift because of which a load increase occurs. This load increase is an increase of the mass throughput which comes through the catalytic converter. Such a combination of the ignition angle retarding and the increase of the mass throughput causes a temperature increase and an exhaust gas post-treatment. The ignition angle shift is performed in a modern engine controller (which is torque-guided) on the basis of a torque model, as described, for example, in German Patent Document DE 101 49 477 A1.

Various methods for monitoring and controlling such catalytic converter heating measures are known. In addition, the California Air Resources Board (CARB) encourages the diagnosis of the ignition angle intervention, which is also responsible for the heating of the catalytic converter, in the scope of the topic of "cold start monitoring." Without this function, licensing is made significantly more difficult. Up to this point, there has been no monitoring of the actual ignition angle intervention for the rapid heating of the catalytic converter. Only the indirect variables which result in the setting of the ignition angle in the catalytic converter heating mode, such as the throttle valve, the idle speed, the air-mass meter, and the ignition system, are currently monitored.

The present invention therefore specifies a method for monitoring the functionality of the heating of a catalytic converter situated in an exhaust system of an internal combustion engine, which is based on monitoring the ignition angle intervention.

According to the present invention, there is described a method for monitoring the functionality of the heating of a catalytic converter situated in an exhaust system of an internal combustion engine, in which a current ignition angle is acquired over a specified time and converted into a torque model used for catalytic converter heating, using which a degree of fulfillment of executed catalytic converter heating measures is obtained, through which an error signal is generated using a limiting value comparison.

A method of this type connects the official requirement for ignition angle monitoring to the torque model used for the catalytic converter heating. The function is thus more resistant to errors than solely monitoring the ignition angle. Because it is a purely diagnostic method, no change in the driving behavior is to be expected and thus no reapplication/monitoring are necessary, as in ignition angle limiting.

To convert the current ignition angle into the torque model from a current ignition angle, the ACTUAL torque reserve is advantageously determined by calculating an intake air mass and an ignition angle efficiency, the ignition angle efficiency being obtained in that the current ignition angle is compared to an optimal ignition angle for the current operating point. A reference torque results from the intake air mass here.

The degree of fulfillment of executed catalytic converter heating measures is preferably obtained by comparing the ACTUAL torque reserve determined from a current ignition angle to a SETPOINT torque reserve, corresponding thereto, requested for the catalytic converter heating measures.

In this case, the degree of fulfillment of the executed catalytic converter heating measures is further preferably obtained in that differences of ACTUAL torque reserves, determined from a current ignition angle, to SETPOINT torque reserves corresponding thereto are summed over the specified time and the summed differences are compared to the corresponding summed SETPOINT torque reserves. The summation of the differences of ACTUAL torque reserves determined over the specific time from a current ignition angle to SETPOINT torque reserves corresponding thereto and the summation of the SETPOINT torque reserves preferably is performed in each case via integration.

Furthermore, the comparison of the summed differences to the correspondingly summed SETPOINT torque reserves preferably is performed via a quotient calculation. In this case, a percent deviation of the ACTUAL torque reserves from the SETPOINT torque reserves requested for the catalytic converter heating measures may be acquired especially easily.

According to the present invention, an error is preferably indicated by the error signal if the degree of fulfillment of executed catalytic converter heating measures lies below a predetermined limiting value. The generated error signal may, for example, cause an entry of the error "catalytic converter heating faulty" in an error memory of the vehicle.

According to the present invention, the specified time is preferably defined via a predetermined sum of summed SETPOINT torque reserves requested for the catalytic converter heating measures. In this way, it is taken into consideration that the detection of an error is more reliable after a minimal time span, because of which an error is first output when a certain summed SETPOINT catalytic converter heating torque reserve, i.e., a total SETPOINT torque reserve, is reached.

An error indicated by the error signal is advantageously debounced in an error memory manager according to the present invention. In this way, the error may be digitally debounced in an especially simple way, without the actual monitored signal of the ignition angle intervention having to be debounced.

The monitoring according to the present invention of the functionality of the heating of a catalytic converter situated in an exhaust system of an internal combustion engine is preferably performed when the internal combustion engine is in an idle state. To ensure that otherwise no such functionality check will occur, zero values are preferably applied within the diagnostic unit to the integrators for summing the differences of ACTUAL torque reserves determined over the specified time from a current ignition angle, to SETPOINT torque reserves corresponding thereto and the SETPOINT torque reserves.

Other objects, advantages and novel features of the present invention will become apparent from the following detailed description of the invention when considered in conjunction with the accompanying drawings.

BRIEF DESCRIPTION OF THE DRAWINGS

Further details, advantages, and features of the present invention result from the following description on the basis of the following drawings.

DETAILED DESCRIPTION OF THE DRAWINGS

Figure 1:
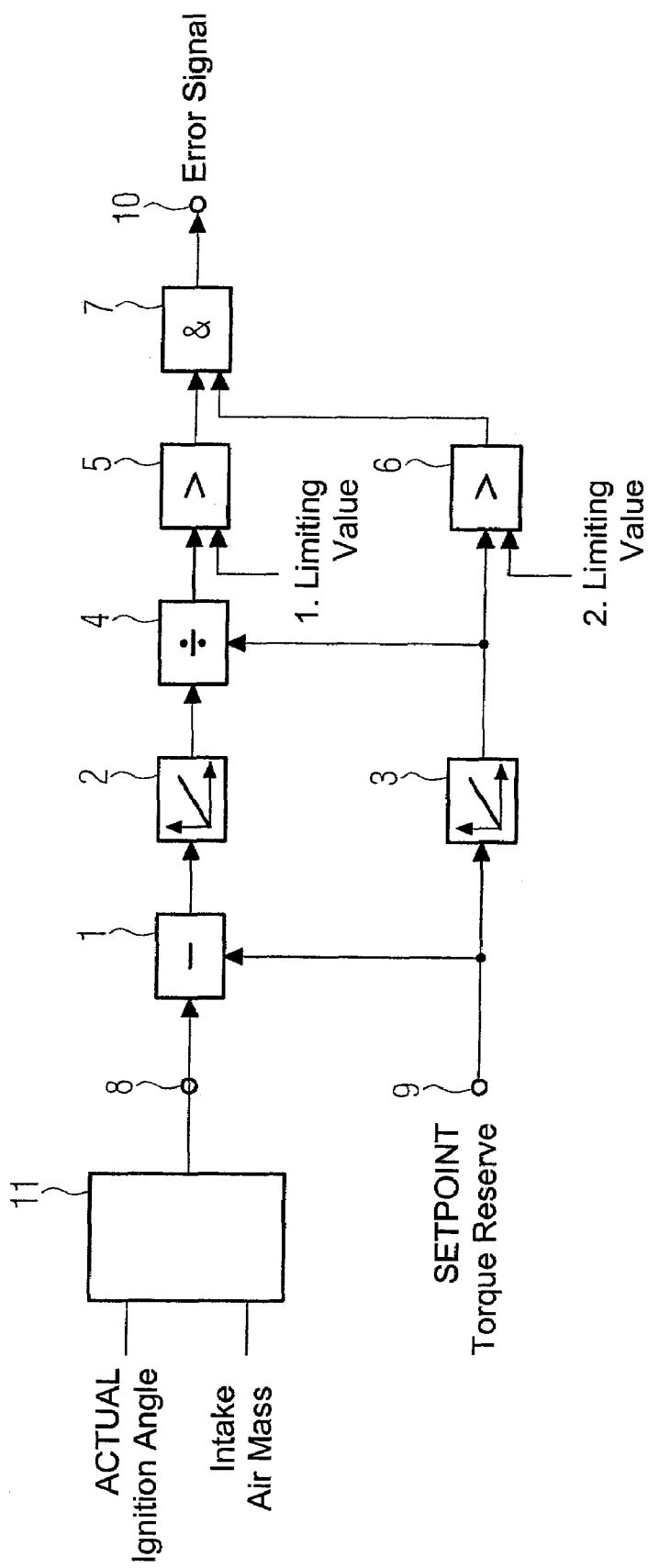
FIG. 1 shows a block diagram for generating an error signal according to an advantageous embodiment of the present invention.

The exemplary diagnostic unit shown in FIG. 1 has a first input 8 for the current ACTUAL torque reserve, a second input 9 for the current SETPOINT torque reserve, and an input 10 for the generated error signal. The signal of the current ACTUAL torque reserve coming from the first input 8 is fed to a subtracter 1, in which the signal of the current SETPOINT torque reserve, which is also fed thereto from the second input 9, and which is requested for the heating of the catalytic converter, is subtracted from the current ACTUAL torque reserve. The applied ACTUAL torque reserve is determined from the current ACTUAL ignition angle and the intake air mass using, for example, a computing unit 11 connected upstream from the input 8, which is also part of the diagnostic unit.

The difference of the torque reserve, which may be determined on the basis of torque and/or ignition angle interventions, output by the subtracter 1, is fed to a first integrator 2, which calculates a total difference between the requested SETPOINT torque reserve and the ACTUAL torque reserve during the time of the analysis, which corresponds to an ignition angle difference. The current SETPOINT torque reserve is also fed by the second input 2 to a second integrator 3, which calculates the total SETPOINT torque reserve, which is requested for the heating of the catalytic converter, during the time of the analysis. The output values of the first integrator and the second integrator 3 are fed to a divider 4, which calculates the quotients of these values to determine the percent deviation of the total ACTUAL torque reserve from the total SETPOINT torque reserve, i.e., a degree of fulfillment of the executed catalytic converter heating measures. The degree of fulfillment output by the divider 4 is fed to a first comparator 5, by which it is compared to a first limiting value also applied thereto, which reflects an emission limiting value. If the degree of fulfillment is above the first limiting value, the expanded emission limiting value is reached and the system is recognized as functioning properly. If the degree of fulfillment lies below the first limiting value, the emission limiting value is exceeded, because of which an error signal is output by the first comparator 5, which is applied to an AND element 7. The AND element 7 also receives a signal output by a second comparator 6, which indicates whether a specific summed SETPOINT catalytic converter heating torque reserve has been reached. If so, the error signal output by the first comparator 5 is output by the AND element 7, which does not occur if the second comparator 6 indicates that the specific summed SETPOINT catalytic converter heating torque reserve is not yet reached.

The determination by the second exemplary comparator 6, as to whether the specific summed SETPOINT catalytic converter heating torque reserve is reached, occurs via a comparison of the value of the total SETPOINT torque reserve output by the second integrator 3, which was requested for the heating of the catalytic converter, to a second limiting value.

Figure 2:
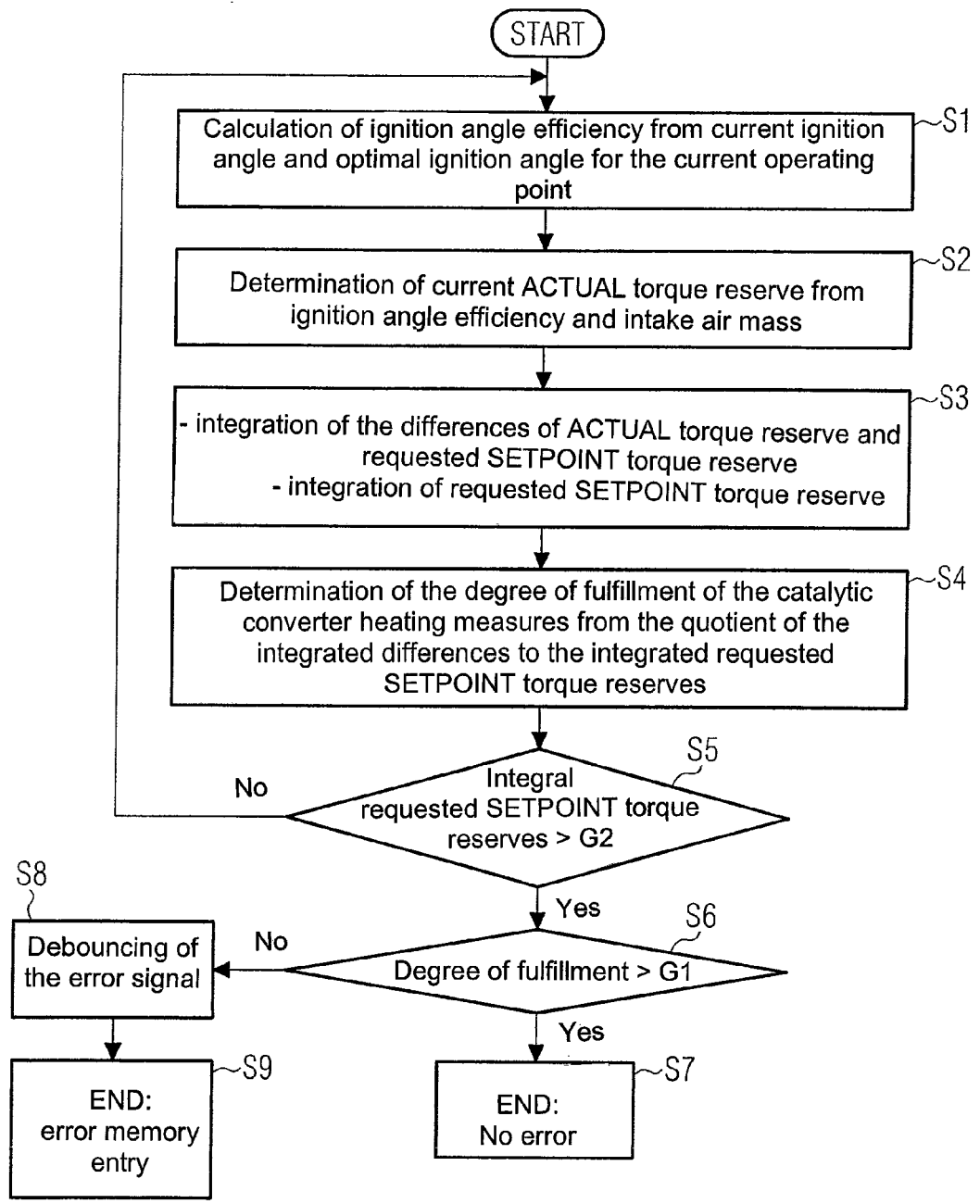
FIG. 2 shows a flowchart of an exemplary method according to the present invention for outputting an error signal according to the preferred embodiment shown in FIG. 1.

FIG. 2 shows a flowchart of the diagnostic unit shown in FIG. 1 according to a preferred embodiment of the method executed in the present invention. After the start, in a first step S1, the ignition angle efficiency is calculated from the current ignition angle and the optimal ignition angle for the current operating point. In a following step S2, the current ACTUAL torque reserve is determined from the calculated ignition angle efficiency and the intake air mass. An integration of the differences of ACTUAL torque reserve and the requested SETPOINT torque reserve as well as the integration of the requested SETPOINT torque reserve then follow in a third step S3. In a following fourth step S4, the degree of fulfillment of the executed catalytic converter heating measures is determined from the quotient of the integrated differences to the integrated requested SETPOINT torque reserve, i.e., the total SETPOINT torque reserve.

In a following step S5, it is determined whether the integral of the requested SETPOINT torque reserve, i.e., the total SETPOINT torque reserve, is greater than the second limiting value. If not, the sequence returns into step S1, by which further values of the then current ACTUAL torque reserve and the then current SETPOINT torque reserve are determined and/or acquired and integrated. However, if it is determined in fifth step S5 that the integral of the requested SETPOINT torque reserve is greater than the second limiting value, it is checked in a following sixth step S6 whether the degree of fulfillment determined in fourth step S4 is greater than the first limiting value. If so, the method is thus terminated in a following seventh step S7, because no error exists. However, if it is determined in sixth step S6 that the degree of fulfillment determined in fourth step S4 is not greater than the first limiting value, error debouncing is performed in an error memory manager in an eighth step S8, after which the method is terminated in a following new step S9 by an error memory entry.

According to the present invention, the ACTUAL torque reserve is accordingly calculated from the comparison of the current ignition angle to the optimal ignition angle for the current operating point. The current ACTUAL torque reserve may be determined from the ignition angle efficiency thus resulting using the intake air mass, from which the reference torque results. This ACTUAL torque reserve is compared to the SETPOINT torque reserve and the differences are summed. A comparison of this differential torque reserve and the total SETPOINT torque reserve results in the degree of fulfillment of the executed catalytic converter heating measures. If the degree of fulfillment lies above the first limiting value, the expanded emission limiting value is reached and the system is recognized as functioning properly.

If the degree of fulfillment is below the first limiting value, the emission limiting value is exceeded and an error is entered; the system is recognized as inefficient. The function detects an error more reliably after a minimal time, because of which the error is first output when a specific summed SETPOINT catalytic converter heating torque reserve, i.e., a specific total SETPOINT torque reserve, is reached. The error is still subsequently debounced in the error memory manager.

The following reference numerals is provided to facilitate understanding of the foregoing text and drawings.

1 subtracter
2 integrator
3 integrator
4 divider
5 comparator
6 comparator
7 AND element
8 first input
9 second input
10 output
11 computing unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring the functionality of the heating of a catalytic converter situated in an exhaust system of an internal combustion engine, comprising the acts of:
    detecting, by a controller, a current ignition angle over a specific time;
    converting, by the controller, the current ignition angle into a torque model used for catalytic converter heating;
    obtaining, by the controller and using the torque model, a degree of fulfillment of executed catalytic converter heating measures; and
    generating, by the controller, an error signal using a limiting value comparison with the degree of fulfillment.

2. The method according to claim 1, further comprising the acts of:
    determining an ACTUAL torque reserve from a current ignition angle to convert the current ignition angle into the torque model; and
    calculating an intake air mass and an ignition angle efficiency, the ignition angle efficiency being obtained in that the current ignition angle is compared to an optimal ignition angle for the current operating point.

3. The method according to claim 1, further comprising indicating an error by the error signal when the degree of fulfillment of executed catalytic converter heating measures lies below a predetermined limiting value.

4. The method according to claim 1, further comprising debouncing an error indicated by the error signal in an error memory manager.

5. The method according to claim 1, wherein monitoring of the functionality of the heating of the catalytic converter situated in the exhaust system of the internal combustion engine occurs during an idle state of the internal combustion engine.

6. The method according to claim 1, further comprising obtaining the degree of fulfillment of executed catalytic converter heating measures by comparing an ACTUAL torque reserve determined from a current ignition angle to a SETPOINT torque reserve requested for the catalytic converter heating measures, which corresponds thereto.

7. The method according to claim 6, wherein the degree of fulfillment of executed catalytic converter heating measures is obtained by summing differences of ACTUAL torque reserves determined over a specified time from a current ignition angle from SETPOINT torque reserves corresponding thereto, and by comparing the summed differences to the corresponding summed SETPOINT torque reserve.

8. The method according to claim 7, wherein the comparison of the summed differences to the corresponding summed SETPOINT torque reserve is performed via a quotient calculation.

9. The method according to claim 7, wherein the specified time is defined via a predetermined sum of summed SETPOINT torque reserves requested for the catalytic converter heating measures.

10. A system for monitoring a catalytic converter situated in an exhaust system of an internal combustion engine, comprising:
    a controller for receiving signals of a current ignition angle; wherein the controller converts the current ignition angle into a torque model used for catalytic converter heating, obtains, using the torque model, a degree of fulfillment of executed catalytic converter heating measures, and generates an error signal using a limiting value comparison with the degree of fulfillment.

11. The system according to claim 10, wherein the controller further determines an ACTUAL torque reserve from a current ignition angle to convert the current ignition angle into the torque model, and calculates an intake air mass and an ignition angle efficiency, the ignition angle efficiency being obtained by comparing the current ignition angle to an optimal ignition angle for the current operating point.

12. The system according to claim 10, wherein the controller further indicates an error by the error signal when the degree of fulfillment of executed catalytic converter heating measures lies below a predetermined limiting value.

13. The system according to claim 10, wherein the controller further compares the summed differences to the corresponding summed SETPOINT torque reserve via a quotient calculation.

14. The system according to claim 10, further comprising an error memory manager for debouncing an error indicated by the error signal.

* * * * *